US011353566B2

(12) United States Patent
Sandretto

(10) Patent No.: US 11,353,566 B2
(45) Date of Patent: Jun. 7, 2022

(54) SONAR TRANSDUCER HAVING A GYROSCOPE

(71) Applicant: NAVICO HOLDING AS, Egersund (NO)

(72) Inventor: Peter Sandretto, Tulsa, OK (US)

(73) Assignee: NAVICO HOLDING AS, Egersund (NO)

( * ) Notice: Subject to any disclaimer, the term of this patent is extended or adjusted under 35 U.S.C. 154(b) by 521 days.

(21) Appl. No.: 15/963,355

(22) Filed: Apr. 26, 2018

(65) Prior Publication Data

US 2019/0331779 A1 Oct. 31, 2019

(51) Int. Cl.
*H04B 17/00* (2015.01)
*G01S 7/52* (2006.01)
*G01S 15/89* (2006.01)

(52) U.S. Cl.
CPC ........... *G01S 7/52004* (2013.01); *G01S 15/89* (2013.01)

(58) Field of Classification Search
None
See application file for complete search history.

(56) References Cited

U.S. PATENT DOCUMENTS

| 3,039,078 A * | 6/1962 | Wilcoxon | G10K 11/355 367/12 |
| 3,119,189 A * | 1/1964 | Hyne | G01S 3/801 367/106 |
| 3,176,262 A * | 3/1965 | Ehrlich | G01S 15/42 367/98 |
| 3,178,679 A * | 4/1965 | Wilkinson | G01S 15/101 367/12 |
| 3,304,534 A | 2/1967 | Sykes | |
| 3,451,039 A * | 6/1969 | Epstein | G01S 3/8038 367/132 |
| 3,706,925 A | 12/1972 | Engelhardt | |

(Continued)

FOREIGN PATENT DOCUMENTS

| KR | 101235248 B1 * | 2/2013 |
| KR | 20140115684 A | 10/2014 |
| KR | 101809602 B1 * | 12/2017 |

OTHER PUBLICATIONS

Jensen, Johan Kleiberg. Attitude Estimation for Motion Stabilization in Sonar Systems. MS thesis. 2013. (Year: 2013).*

(Continued)

*Primary Examiner* — Isam A Alsomiri
*Assistant Examiner* — Jonathan D Armstrong
(74) *Attorney, Agent, or Firm* — Nelson Mullins Riley & Scarborough LLP

(57) ABSTRACT

A sonar assembly is provided including at least one transducer configured to transmit one or more sonar beams into an underwater environment, a gyroscope configured to measure angular velocity associated with the at least one transducer, a processor, and a memory. The memory including computer program code configured to, when executed on the processor, cause the processor to determine orientation data associated with the at least one transducer based on the angular velocity measured by the gyroscope, determine if the orientation data corresponds to the at least one transducer being in a desired orientation, and cause an alert in response to the at least one transducer not being in the desired orientation.

20 Claims, 10 Drawing Sheets

(56) References Cited

U.S. PATENT DOCUMENTS

| | | | |
|---|---|---|---|
| 3,877,314 A | 4/1975 | Bernin | |
| 4,052,693 A * | 10/1977 | Gilmour | G01S 15/88 367/103 |
| 5,214,744 A * | 5/1993 | Schweizer | G01S 7/52004 382/103 |
| 5,321,667 A * | 6/1994 | Audi | G01S 15/8902 367/88 |
| 5,954,551 A * | 9/1999 | King | B63H 25/42 440/6 |
| 6,106,038 A | 8/2000 | Dreher | |
| 6,122,538 A * | 9/2000 | Sliwa, Jr. | A61B 8/00 324/207.14 |
| 6,226,227 B1 * | 5/2001 | Lent | G01S 7/6236 367/104 |
| 7,355,924 B2 * | 4/2008 | Zimmerman | G01S 7/52003 367/131 |
| 7,457,197 B1 | 11/2008 | Parsons | |
| 7,652,952 B2 * | 1/2010 | Betts | G01S 7/521 367/88 |
| 7,961,552 B2 * | 6/2011 | Boucher | G10K 11/006 367/173 |
| 9,739,884 B2 | 8/2017 | Proctor et al. | |
| 9,767,625 B1 * | 9/2017 | Snyder | G01P 15/0891 |
| 10,034,066 B2 | 7/2018 | Tran | |
| 10,112,700 B1 | 10/2018 | Birch | |
| 10,246,183 B1 | 4/2019 | Saunders | |
| 10,717,509 B2 * | 7/2020 | Schroeder | B63H 20/14 |
| 2002/0013106 A1 | 1/2002 | Healey | |
| 2005/0247251 A1 | 11/2005 | Scism | |
| 2005/0265123 A1 * | 12/2005 | Pope | G01S 7/64 367/99 |
| 2006/0043712 A1 | 3/2006 | Hakki | |
| 2007/0025183 A1 * | 2/2007 | Zimmerman | G01S 7/52003 367/88 |
| 2008/0223131 A1 * | 9/2008 | Vannucci | A61B 5/1122 73/510 |
| 2008/0239869 A1 * | 10/2008 | Lohrmann | G01S 15/588 367/3 |
| 2009/0238042 A1 | 9/2009 | Hawkinson | |
| 2010/0061187 A1 * | 3/2010 | Sodal | G01V 1/001 367/131 |
| 2010/0291816 A1 | 11/2010 | Arvidsson | |
| 2011/0054784 A1 * | 3/2011 | Wood | G09B 29/006 701/533 |
| 2013/0016588 A1 * | 1/2013 | O'Dell | G10K 11/006 367/173 |
| 2013/0197747 A1 | 8/2013 | Tourin | |
| 2014/0010042 A1 * | 1/2014 | Thomas | G01S 7/6272 367/7 |
| 2014/0022864 A1 | 1/2014 | Lebedev | |
| 2014/0071167 A1 * | 3/2014 | Lauenstein | G01S 15/96 345/634 |
| 2014/0107489 A1 * | 4/2014 | Fearnot | A61B 8/12 600/463 |
| 2015/0006038 A1 | 1/2015 | Gustavsson | |
| 2015/0085602 A1 | 3/2015 | Lededev | |
| 2015/0294660 A1 * | 10/2015 | Stokes | G01S 15/86 367/173 |
| 2015/0355012 A1 * | 12/2015 | Gurumohan | H04Q 9/00 702/55 |
| 2015/0369908 A1 * | 12/2015 | Zimmerman | G01S 15/96 367/7 |
| 2016/0125739 A1 * | 5/2016 | Stewart | G01C 21/203 701/21 |
| 2016/0162145 A1 * | 6/2016 | Rivers | G01C 21/12 715/769 |
| 2016/0259520 A1 * | 9/2016 | Gatland | G06F 3/04883 |
| 2016/0320484 A1 | 11/2016 | Lanham | |
| 2016/0341827 A1 | 11/2016 | Horner et al. | |
| 2016/0362164 A1 * | 12/2016 | Page | B63B 49/00 |
| 2017/0003865 A1 * | 1/2017 | Gatland | G06F 3/04847 |
| 2017/0090021 A1 * | 3/2017 | Sayer | G01S 15/88 |
| 2017/0146642 A1 * | 5/2017 | Stokes | G01S 7/6218 |
| 2017/0219703 A1 | 8/2017 | Proctor et al. | |
| 2017/0227639 A1 * | 8/2017 | Stokes | G01S 7/6272 |
| 2017/0285134 A1 * | 10/2017 | Stokes | G01S 7/6263 |
| 2017/0285167 A1 | 10/2017 | Proctor et al. | |
| 2017/0299703 A1 * | 10/2017 | Stokes | G01S 7/52077 |
| 2017/0315020 A1 | 11/2017 | Seminel | |
| 2018/0100922 A1 * | 4/2018 | Wigh | G01S 7/6272 |
| 2018/0164434 A1 * | 6/2018 | Stokes | G01S 15/96 |
| 2018/0165870 A1 * | 6/2018 | Stokes | G06T 15/08 |
| 2018/0217256 A1 * | 8/2018 | Stokes | G01K 13/02 |
| 2018/0217257 A1 * | 8/2018 | Murphy | A01K 97/125 |
| 2018/0259338 A1 * | 9/2018 | Stokes | G01C 21/203 |
| 2018/0313953 A1 * | 11/2018 | Gatland | G01S 7/6272 |
| 2018/0329056 A1 * | 11/2018 | Smith | G01S 7/521 |
| 2019/0072951 A1 * | 3/2019 | Clark | B64D 47/02 |
| 2019/0120959 A1 * | 4/2019 | Laster | G01S 7/003 |
| 2019/0127034 A1 * | 5/2019 | Larson | G01S 15/89 |
| 2019/0137618 A1 * | 5/2019 | Hawker | G01S 7/52068 |
| 2019/0263487 A1 * | 8/2019 | Corl | G01C 21/20 |
| 2019/0353763 A1 * | 11/2019 | Sandretto | G01S 15/89 |
| 2020/0064471 A1 * | 2/2020 | Gatland | H04N 13/388 |
| 2020/0088840 A1 * | 3/2020 | Stokes | G01S 13/42 |
| 2020/0180740 A1 * | 6/2020 | Christ | G05D 1/0027 |
| 2020/0256967 A1 * | 8/2020 | Wigh | G01S 7/521 |
| 2021/0165068 A1 * | 6/2021 | Clark | H04N 1/00411 |

OTHER PUBLICATIONS

Corrigan, Fintan: DroneZon: Drone Technology, Knowledge, News & Reviews "Drone Gyro Stabilization, IMU and Flight Controllers Explained", May 4, 2018 < https://www.dronezon.com/learn-about-drones-quadcopters/three-and-six-axis-gyro-stabilized-drones/> 15 pages.

* cited by examiner

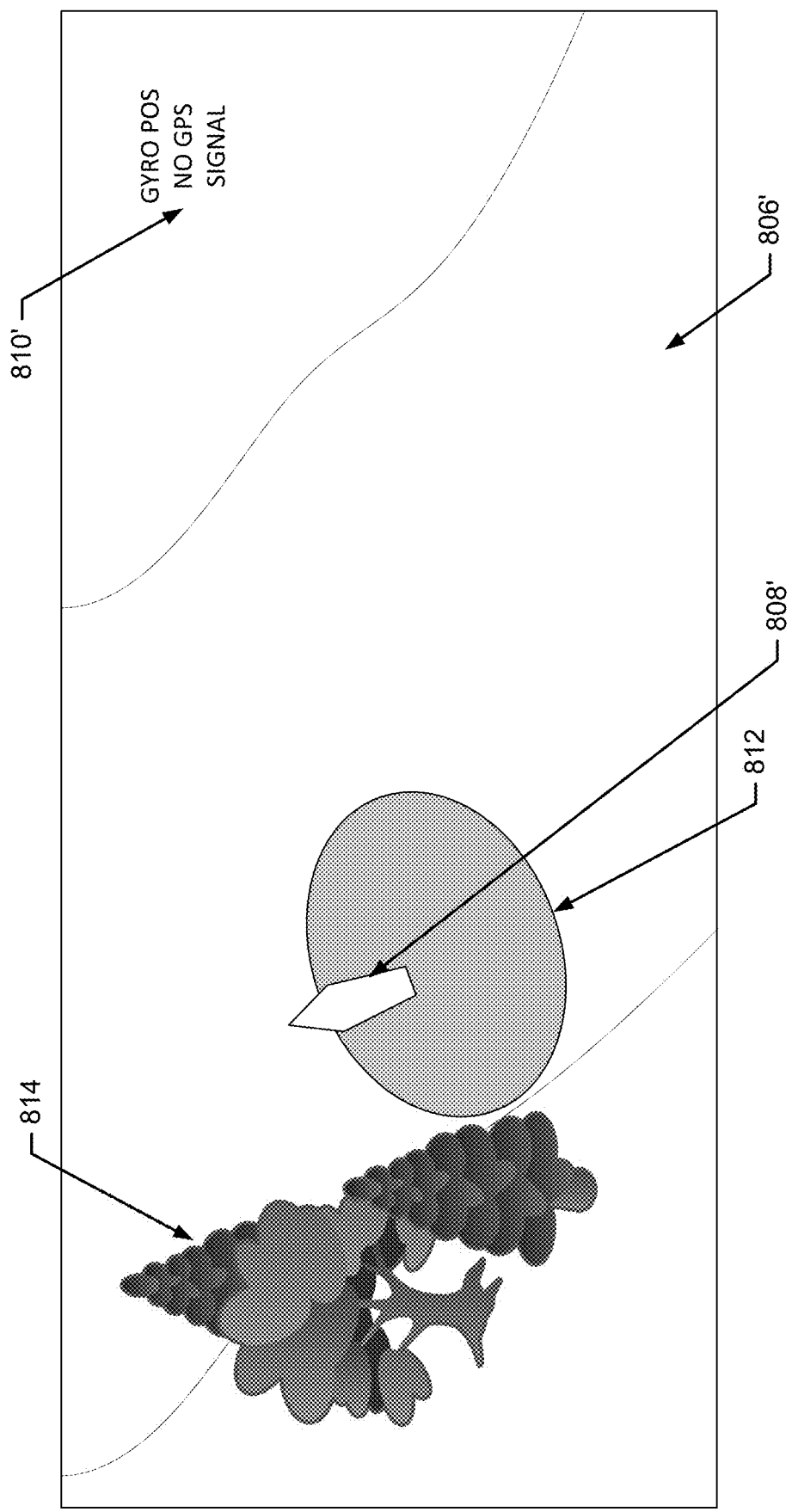

SONAR TRANSDUCER HAVING A GYROSCOPE

FIELD OF THE INVENTION

Embodiments of the present invention relate generally to sonar transducer operation, and more particularly, to systems and apparatuses for sonar transducer operation utilizing a gyroscope.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, convert electrical energy into sound or vibrations at a particular frequency. A sonar sound beam (e.g., one or more sonar signals) is transmitted into and through the water and is reflected from objects it encounters. The transducer receives the reflected sound (the "sonar returns") and converts the sound energy into electrical energy. Based on the known speed of sound, it is possible to determine the distance to and/or location of the waterborne or underwater objects. The sonar return signals can also be processed to be displayed on a display device, giving the user a "picture" (or image) of the underwater environment.

The orientation of a sonar transducer relative to a watercraft may affect the quality or accuracy of the sonar returns. For example, a misaligned sonar transducer may indicate portions of underwater environment closer to the transducer and/or portions of the underwater environment farther from the transducer than reality, due to parallax error.

In some environments, standard positioning systems associated with watercrafts may be ineffective due to reliance on external signals. Some example positioning systems, including global positioning systems and cellular positioning systems, rely on signals from satellites and/or transceiver towers, which can be used to triangulate a position. However, if these signals are obstructed, such as by weather, foliage, earth, or the like, the positioning system may not be able to acquire a sufficient number of signals to triangulate the position of the watercraft.

BRIEF SUMMARY OF THE INVENTION

In some situations, due to the sonar transducer housing being submerged in water, the housing may strike objects in the underwater environment and, as a result, change orientation from the desired orientation. Such misalignment may cause less preferred sonar data to be acquired.

In some example sonar transducer arrangements of the present invention, a sonar transducer may be provided with a gyroscope. The gyroscope may be used for an initial alignment of the sonar transducer to ensure the sonar transducer is in a desired orientation to produce accurate sonar return. Additionally, the sonar transducer may periodically or continuously monitor the orientation of the sonar transducer to ensure that the sonar transducer remains in the desired orientation and may cause an alert when the sonar transducer is not in the desired orientation.

In some example embodiments, the sonar transducer may include an accelerometer. The accelerometer may be utilized to determine if the sonar transducer strikes an object, which may cause the sonar transducer to move out of the desired orientation. For example, if the measured acceleration data, such as a change in acceleration, is greater than a predetermined strike threshold, an alert may be generated to indicate that the sonar transducer orientation should be checked. Additionally or alternatively, a sonar assembly including the sonar transducer may determine the orientation of the sonar transducer compared to the desired orientation in response to the acceleration data exceeding the strike threshold.

In an example embodiment, the sonar assembly may determine an orientation correction between the measured orientation and the desired orientation. The orientation correction may be displayed on a user interface for an operator to reorient, e.g. realign, the sonar transducer to a reference orientation, which may be the desired orientation. Additionally or alternatively, the sonar assembly may cause the sonar transducer to automatically move to the desired orientation based on the orientation correction, such as by controlling one or more servo motors.

In some example embodiments, the sonar assembly may associate the misalignment with the sonar data collected while the sonar transducer is not in the desired orientation. The misalignment may be displayed in the sonar data by a textbox, highlights, or other indication. In an example embodiment, the locations associated with the sonar data which was collected with the sonar transducer out of the desired orientation may be plotted on a navigational chart. One or more of these locations may be selected and an autopilot may navigate the watercraft to the selected location to collect sonar data, such as after the sonar transducer has been aligned to the desired orientation.

In an example embodiment, the gyroscope and/or the accelerometer may be a portion of a microelectromechanical system (MEMS). In some example embodiments, the MEMS may be mounted to the same printed circuit board as a transducer element of the sonar transducer.

In some example embodiments, the gyroscope and accelerometer may be used to determine an inertial position. The inertial position may be used as a verification of an external signal based position, such as a global positioning system (GPS), or may be used when position data is unavailable, e.g. a marine electronics system is unable to acquire a sufficient number of signals to triangulate a position. The marine electronics system may generate an inertial reference frame and determine an initial position based on the position data. The marine electronics system then may calculate an inertial position based on the initial position, acceleration measurements from the accelerometer, and angular velocity measurements from the gyroscope.

In some example embodiments, the marine electronics device may also include a magnetometer configured to measure a magnetic field strength. The marine electronics device may determine a heading angle based on the measurement of the magnetic field strength, which may be utilized in the calculation of the internal position.

In an instance in which the position data is unavailable, the marine electronics system may display the position of the watercraft as the inertial position on a navigational chart. Additionally, in some embodiments, the marine electronics system may cause an autopilot to navigate based on the inertial position. In embodiments, in which position data is associated with acquired sonar data, the marine electronics device may associate the current internal position with current sonar data when the position data is unavailable. In an example embodiment, the association of the inertial position with the sonar data may be indicated on the user interface, such as by text box, highlighting, or the like on the sonar data displayed on a user interface or on a navigational chart.

In an example embodiment, a sonar assembly is provided including at least one transducer configured to transmit one or more sonar beams into an underwater environment. The at least one transducer is positioned and oriented within a transducer housing such that the at least one transducer is configured to transmit the one or more sonar beams into a portion of the underwater environment when the transducer housing is at least partially submerged. The sonar assembly also includes a gyroscope configured to measure angular velocity associated with the at least one transducer, a processor, and a memory including computer program code. The computer program code is configured to, when executed on the processor, cause the processor to determine orientation data associated with the at least one transducer based on the angular velocity measured by the gyroscope, determine if the orientation data corresponds to the at least one transducer being in a desired orientation, and cause an alert in response to the at least one transducer not being in the desired orientation.

In some example embodiments, the gyroscope comprises a first portion of a microelectromechanical system (MEMS). In an example embodiment, the sonar assembly also includes an accelerometer as a second portion of the MEMS. In some example embodiments, the sonar assembly also includes a magnetometer as a third portion of the MEMS.

In an example embodiment, the gyroscope is mounted to the same printed circuit board (PCB) assembly as the at least one transducer.

In some example embodiments, the memory and the computer program code are further configured to cause the processor to determine an orientation correction based on a difference between the orientation data and a reference orientation. The reference orientation corresponds to the at least one transducer being in the desired orientation. In an example embodiment, the memory and the computer program code are further configured to cause the processor to cause the sonar transducer to be re-positioned to the reference orientation based on the orientation correction.

In some example embodiments, the sonar assembly also includes an accelerometer associated with the at least one transducer. In an example embodiment, the memory and the computer program code are further configured to cause the processor to receive acceleration data from the accelerometer associated with the at least one transducer and determine if the acceleration data exceeds a predetermined strike threshold.

In an example embodiment, the memory and the computer program code are further configured to cause the processor to determine if the orientation data satisfies a predetermined sonar position threshold such that the resulting sonar data from the at least one transducer is out of a desired alignment and cause an indication of exceeding the predetermined sonar position threshold to be associated with sonar data received during a period in which the orientation data exceeds the predetermined sonar position threshold. In some example embodiments, the memory and the computer program code are further configured to cause the processor to cause indication of one or more locations associated with sonar data received during the period in which the orientation data exceeds the predetermined sonar position threshold to be displayed on a navigational chart. In an example embodiment, the memory and the computer program code are further configured to cause the processor to receive an indication of a selection of the one or more locations associated with sonar data received during the period in which the orientation data exceeds the predetermined sonar position threshold. In some example embodiments, the memory and the computer program code are further configured to cause the processor to cause an autopilot to navigate a watercraft associated with the sonar assembly to the selected one or more locations.

In another example embodiment, a marine electronics system is provided including at least one position sensor configured to receive position data, a gyroscope configured to measure angular velocity, an accelerometer configured to measure acceleration, a processor, and a memory including computer program code. The computer program code is configured to, when executed by the processor, cause the processor to determine an initial location of the marine electronic device based on the position data, set an inertial reference frame based on orientation data received from the gyroscope, receive acceleration data from the accelerometer and angular velocity data from the gyroscope, determine a current inertial position based on the acceleration data, the angular velocity data, and the initial location, determine if current position data is available, and cause the current inertial position to be displayed on a navigational chart in an instance in which the current position data is unavailable.

In an example embodiment, the memory and the computer program code are further configured to cause the processor to cause an autopilot to navigate based on the current inertial position.

In some example embodiments, the marine electronics system also includes at least one transducer configured to transmit one or more sonar beams into an underwater environment. The at least one transducer is positioned and oriented within a transducer housing such that the at least one transducer is configured to transmit the one or more sonar beams into a portion of the underwater environment when the transducer housing is at least partially submerged and the memory and the computer program code are further configured to cause the processor to receive sonar data from the at least one transducer. In an example embodiment, the memory and the computer program code are further configured to, with the processor, cause the marine electronics system to associate the sonar data with the current position data and associate sonar data with the current inertial position in an instance in which the current position data is unavailable.

In some example embodiments, the memory and the computer program code are further configured to, with the processor, cause the marine electronics system to cause an indication of a location where the sonar data is associated with the current inertial position to be displayed on a navigational chart.

In an example embodiment, the memory and the computer program code are further configured to cause the processor to determine orientation data based on the angular velocity measured by the gyroscope.

In some example embodiments, the memory and the computer program code are further configured to cause the processor to determine one or more linear accelerations in the inertial reference frame based on the acceleration data and the angular velocity data.

In an example embodiment, the memory and the computer program code are further configured to cause the processor to determine inertial velocities based on the one or more linear accelerations in the inertial reference frame and determine the current inertial position further based on the inertial velocities.

In an example embodiment, the marine electronics system also includes a magnetometer configured to measure magnetic field strength. In some example embodiments, the memory and the computer program code are further configured to cause the processor to receive magnetic field strength data from the magnetometer and determine a heading angle based on the magnetic field strength data. Determining the current inertial position is further based on the heading angle.

In an example embodiment, the accelerometer and the gyroscope comprise portions of a microelectromechanical system (MEMS).

Additional example embodiments of the present invention include apparatuses, methods, systems, and computer program products associated with various embodiments described herein, including, for example, the above described sonar assembly and marine electronics system embodiments.

BRIEF DESCRIPTION OF THE DRAWINGS

Figure 1:
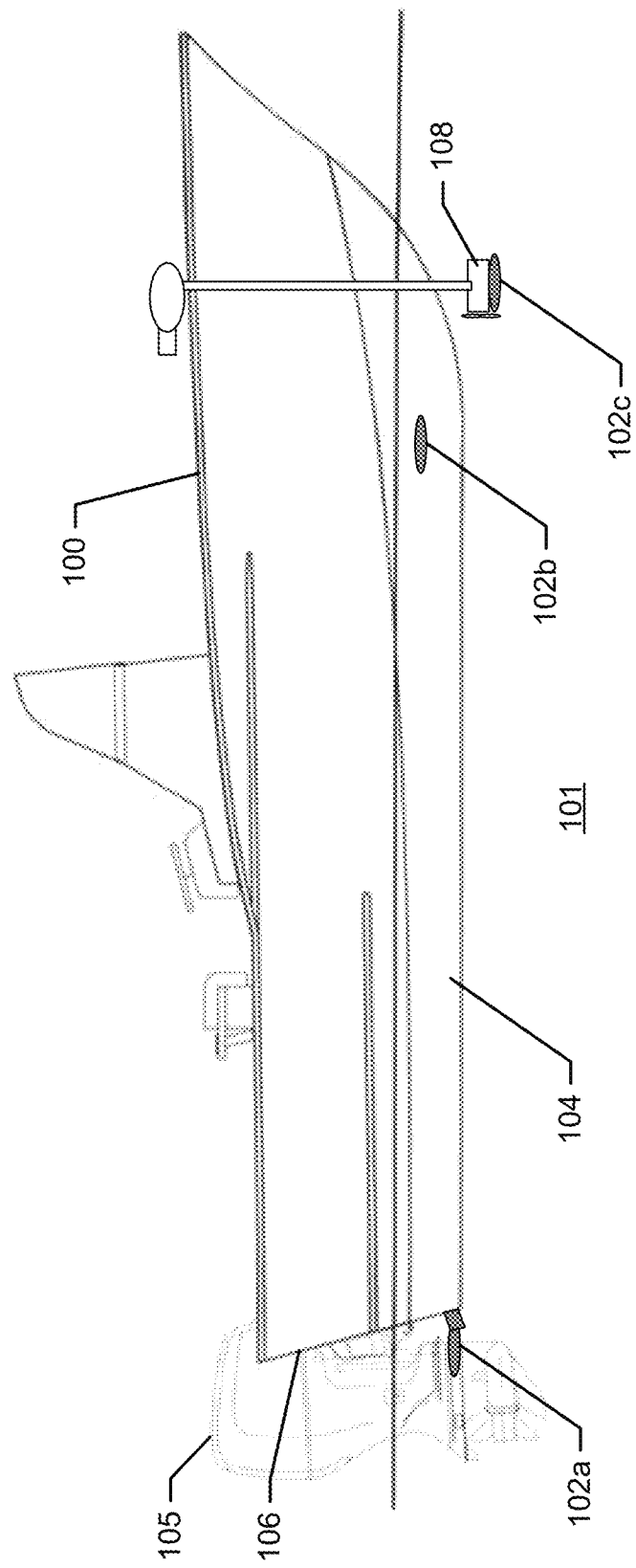
Figure 2:
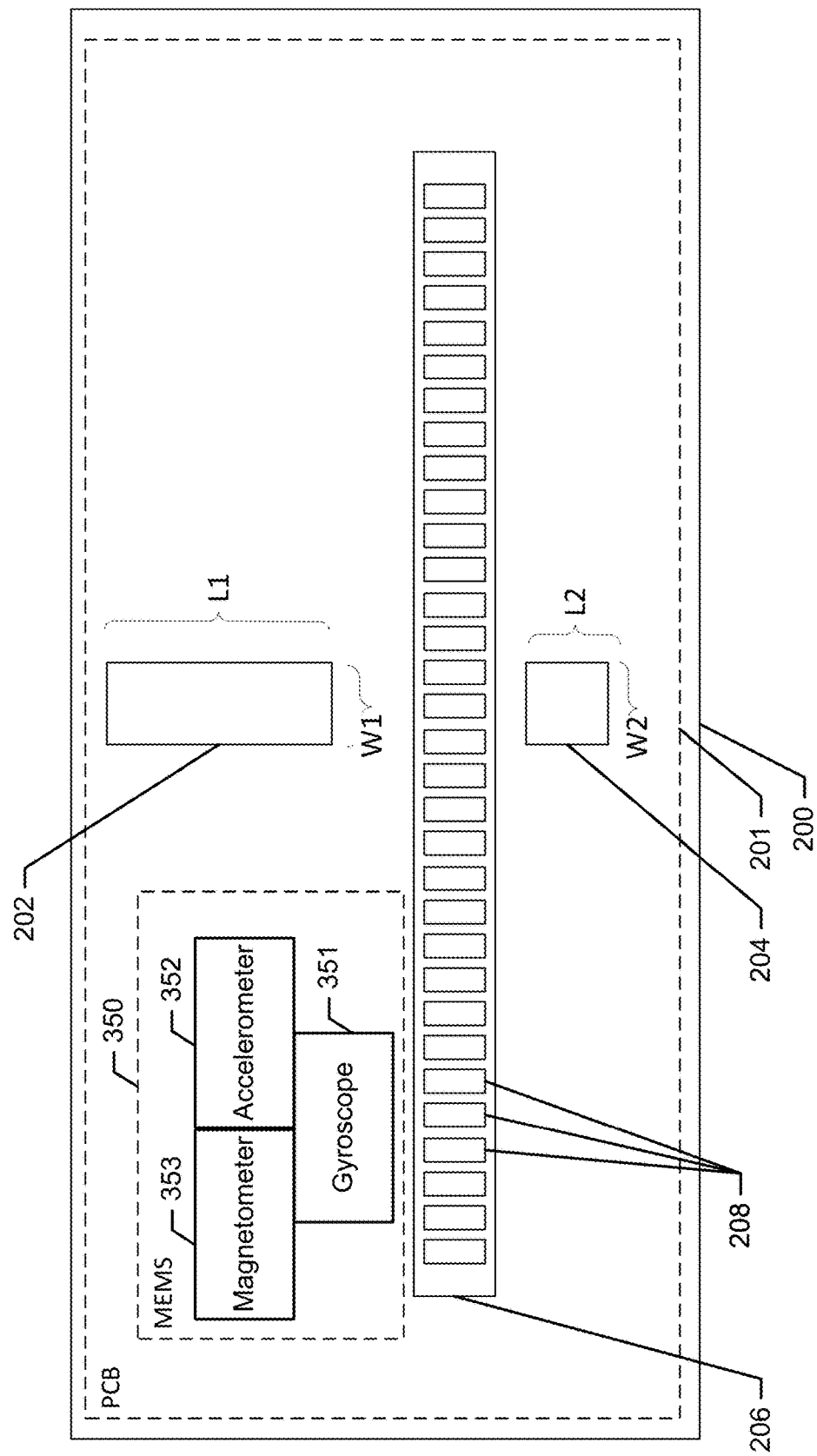
Figure 3:
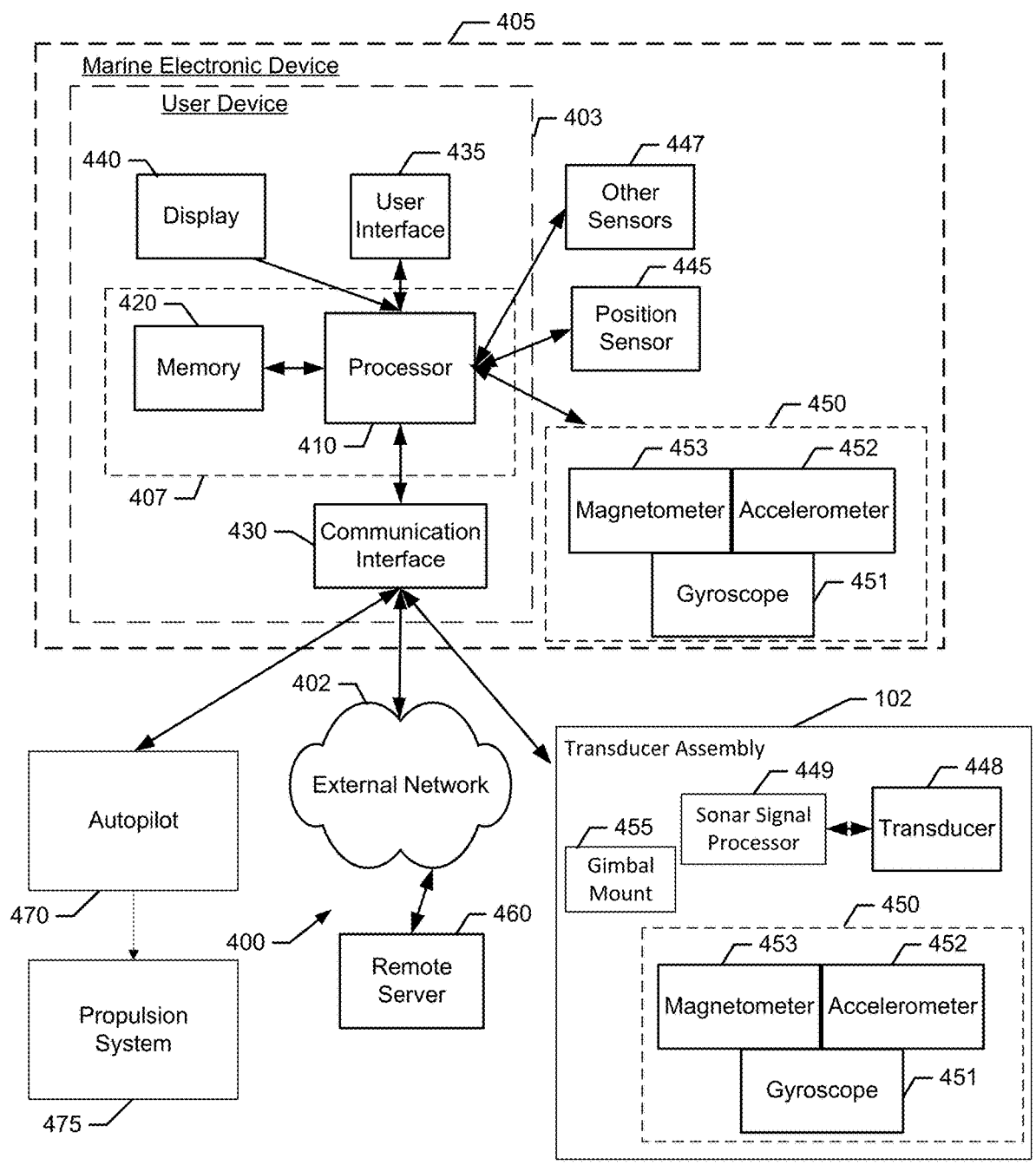
Figure 4A:
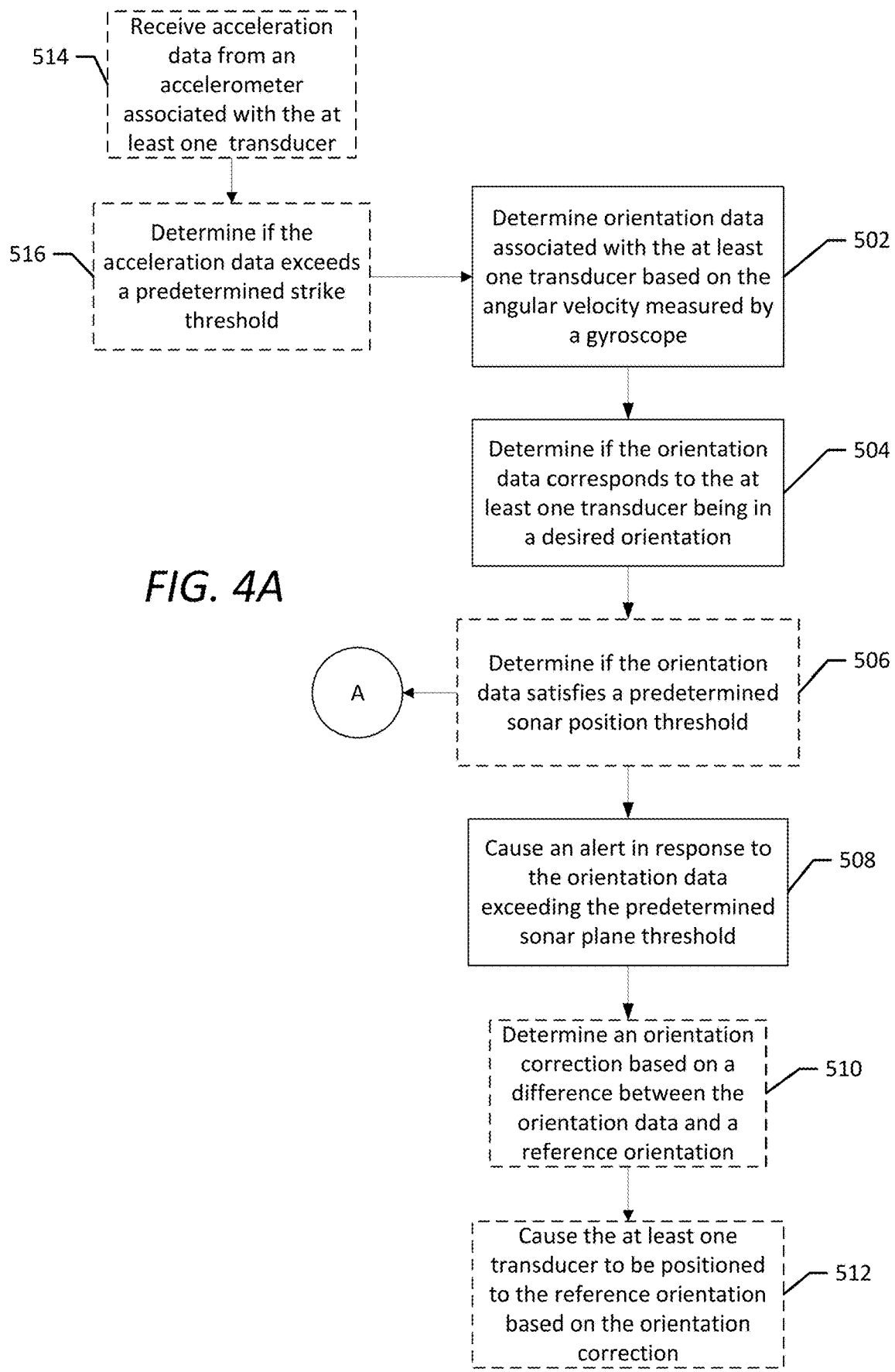
Figure 4B:
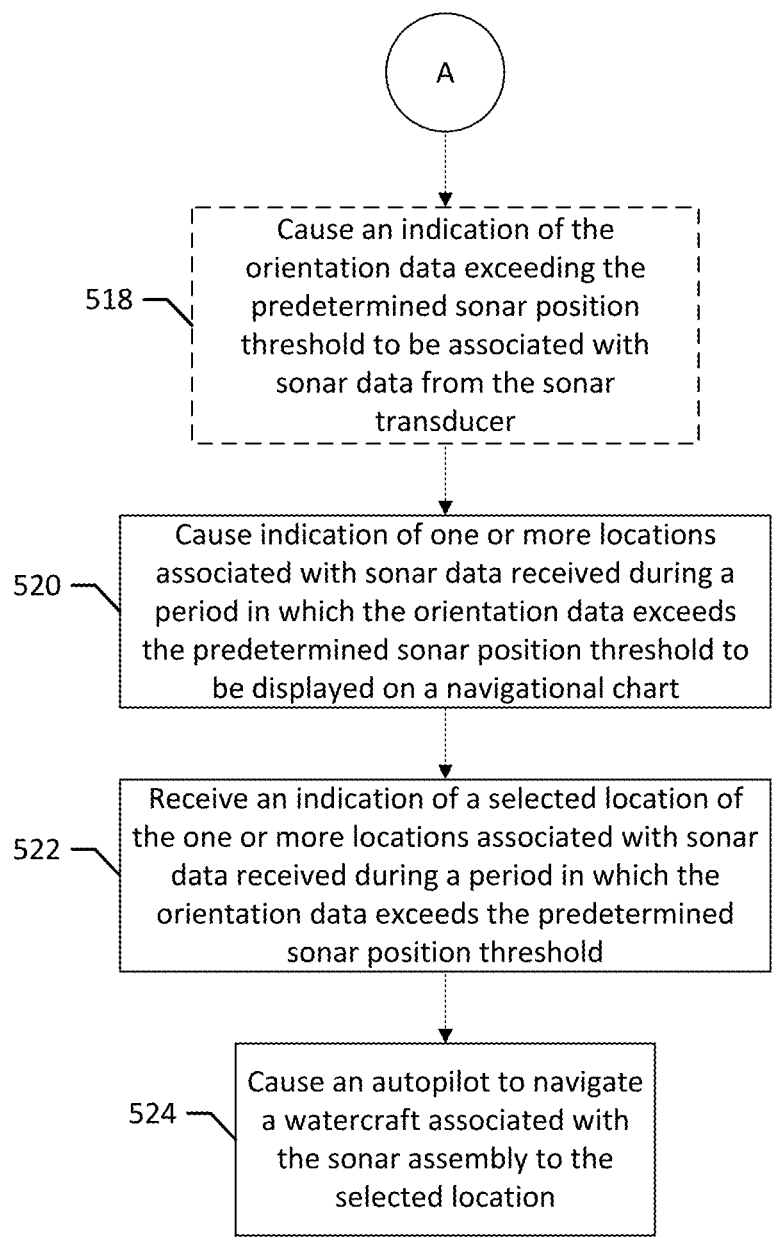
Figure 5:
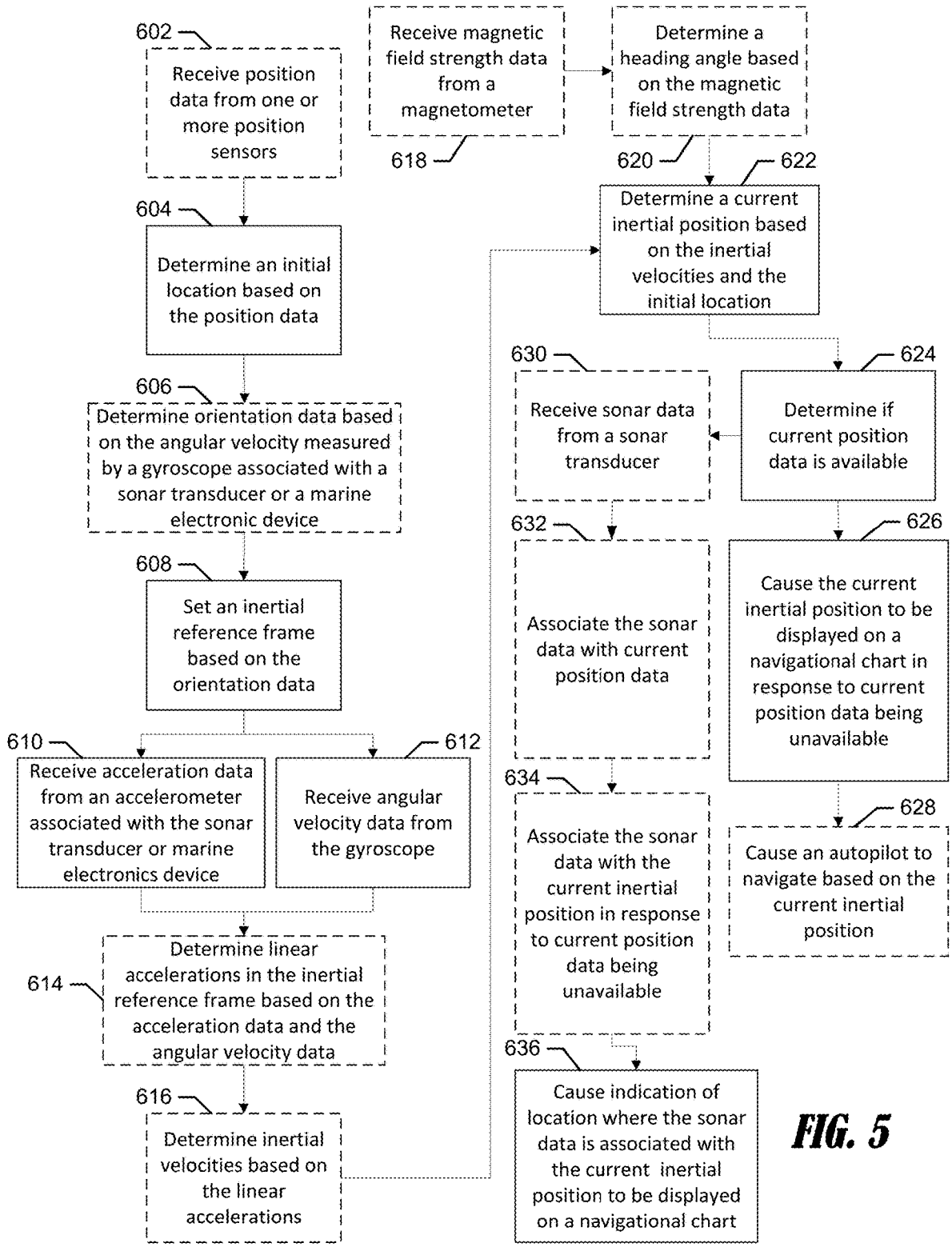
Figure 6:
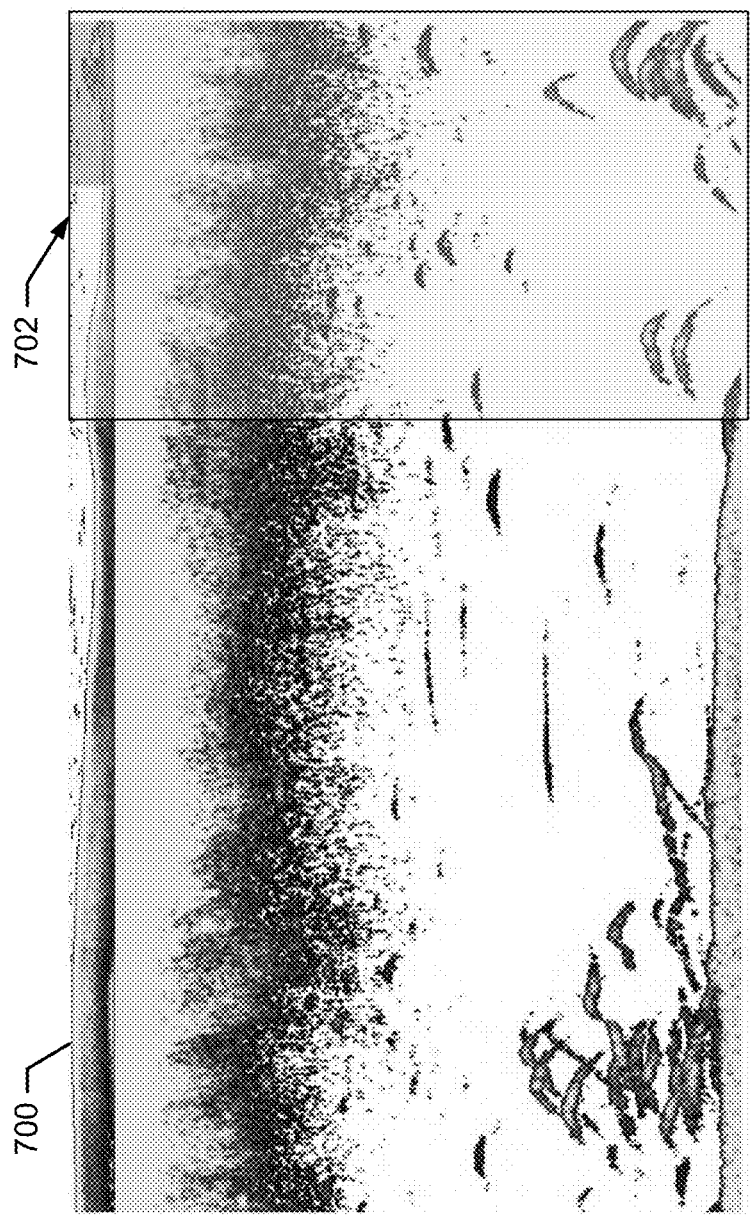
Figure 7:
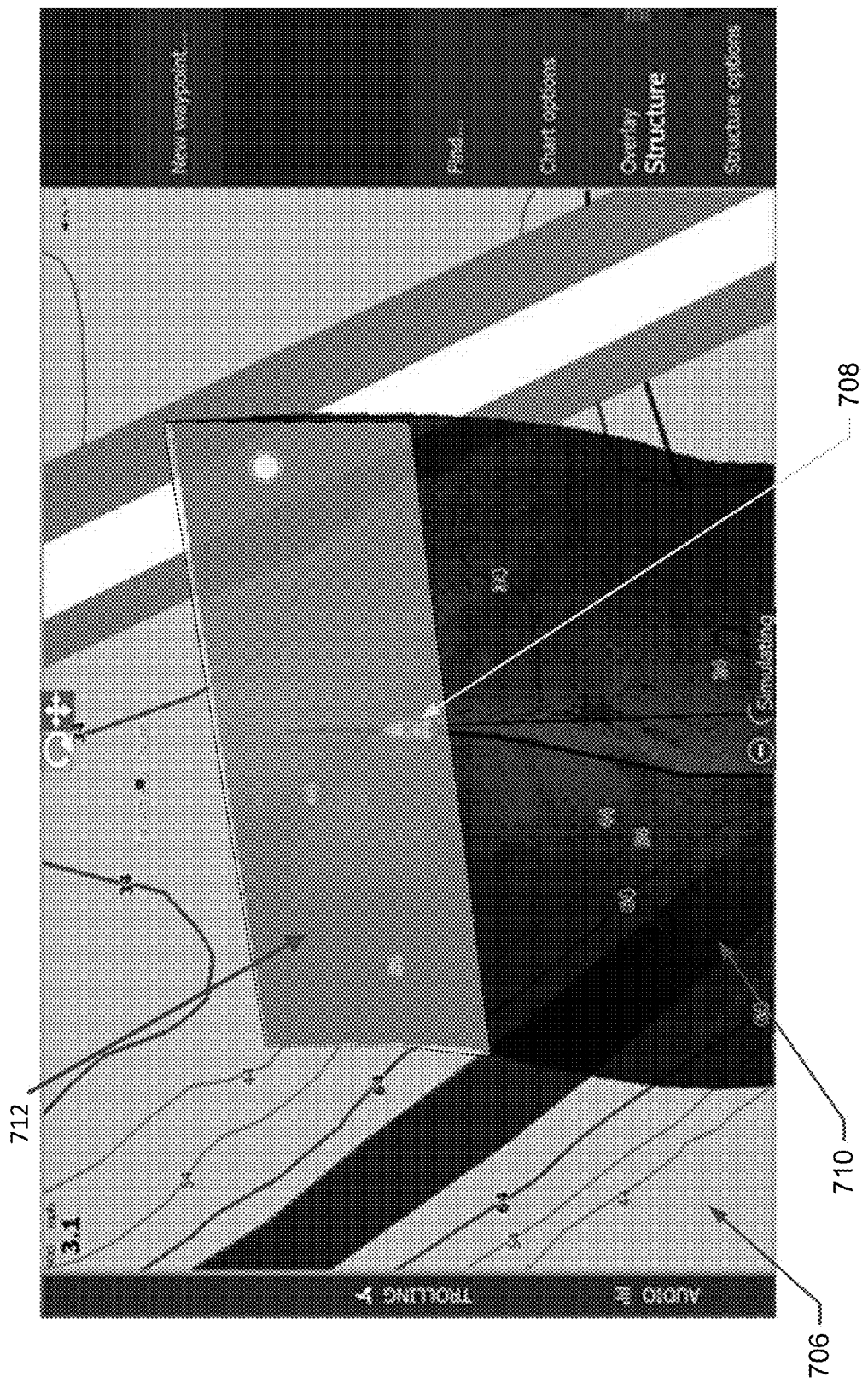
Figure 8:
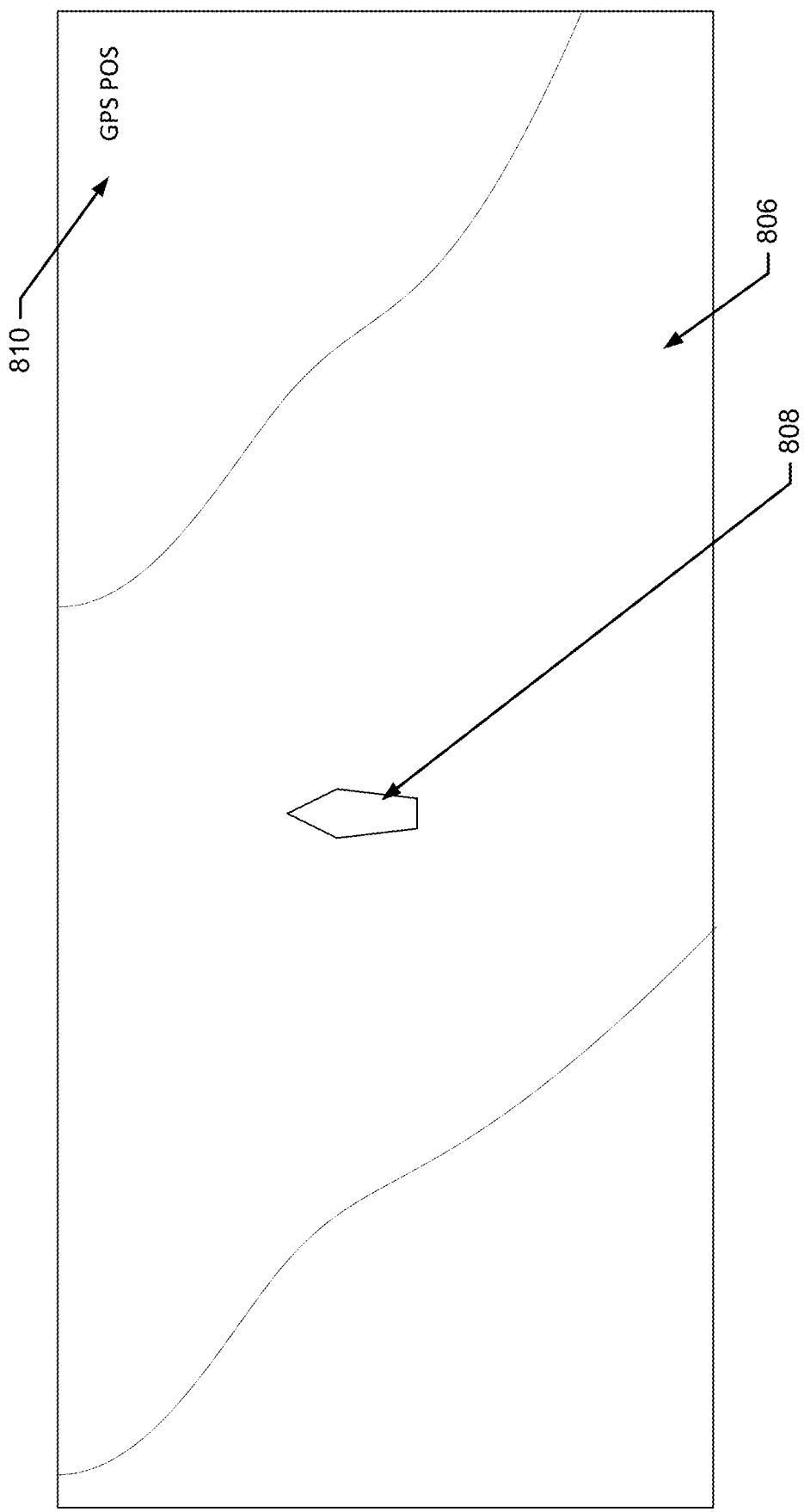

Having thus described the invention in general terms, reference will now be made to the accompanying drawings, which are not necessarily drawn to scale, and wherein:

FIG. 1 illustrates an example watercraft including various sonar transducer assemblies, in accordance with some embodiments discussed herein;

FIG. 2 illustrates an example sonar transducer assembly including a gyroscope, in accordance with some embodiments discussed herein;

FIG. 3 illustrates a block diagram of an example marine electronic system, in accordance with some example embodiments discussed herein;

FIGS. 4A, 4B, and 5 illustrate flowcharts of example methods of operating a marine system according to some embodiments discussed herein;

FIG. 6 illustrates an example sonar image according to some embodiments discussed herein;

FIG. 7 illustrates an example navigational chart with sonar overlay according to some embodiments discussed herein;

FIG. 8 illustrates an example navigational chart displaying a GPS position according to some embodiments discussed herein; and FIG. 9 illustrates an example navigational chart displaying an internal position according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

As depicted in FIG. 1, a watercraft, e.g. vessel 100, configured to traverse a marine environment, e.g. body of water 101, may use one or more sonar transducer assemblies 102a, 102b, and 102c disposed on and/or proximate to the vessel. The vessel 100 may be a surface watercraft, a submersible watercraft, or any other implementation known to those skilled in the art. The transducer assemblies 102a, 102b, and 102c may each include one or more transducer elements configured to transmit sound waves into a body of water, receive sonar return signals from the body of water, and convert the sonar return signals into sonar return data.

One or more sonar beams may be generated by the one or more transducer assemblies 102a, 102b, and 102c when deployed in the body of water 101. In some instances, a plurality of transducer elements may be embodied in a transducer assembly. In some instances, the transducer assembly may include one or more of a right scanning (e.g., sidescan) element, a left scanning (e.g., sidescan) element, a conical downscan sonar element, and/or a bar (e.g., linear, elongated rectangle, or the like) downscan sonar element, which may be housed within a transducer housing. In some example embodiments, the transducer assembly may be a transducer array, e.g. a "phased array." The transducer array may include a plurality of transducer elements arranged on a printed circuit board (PCB) (FIG. 2). The PCB may mechanically support and electrically connect the electronic components, including the transducer elements using conductive tracks (e.g. traces), pads, and other features. The conductive tracks may comprise sets of traces, for example, each transducer element may be mounted to the PCB such that the transducer element is in electrical communication with a set of traces. Each transducer element, sub-array, and/or the array of transducer elements may be configured to transmit one or more sonar pulses and/or receive one or more sonar return signals.

The transducer arrays or individual transducer elements may transmit one or more sonar signals, e.g. sonar beams, into a body of water with a transmit transducer, a transmit/receive transducer, or similar device. When the sound waves, of the sonar beams, strike anything of differing acoustic impedance (e.g., the sea floor or something suspended in the water above the bottom), the sound waves reflect off that object. These echoes (or sonar return signals) may strike the transmitting transducer element and/or a separate one or more sonar receiver elements, which convert the echoes back into an electrical signal which is processed by a processor (e.g., processing circuitry 407 and/or a sonar signal processor 449 as discussed in reference to FIG. 3) and sent to a display (e.g., an LCD) mounted in the cabin or other convenient location in the watercraft. This process is often called "sounding". Since the speed of sound in water may be determined by the properties of the water (approximately 4800 feet per second in fresh water), the time lapse between the transmitted signal and the received echoes can be measured and the distance to the objects determined. This process may repeat itself many times per second. The results of many soundings are used to build a picture on the display of the underwater environment, e.g. a sonar image.

In an example embodiment, the one or more transducers assemblies may include multiple transducer arrays and/or transducer elements cooperating to receive sonar return signals from the underwater environment. The transducer arrays and/or transducer elements may be arranged in a predetermined configuration, e.g. relative positions, including known distances between each transducer array or transducer element. The relative positions and known distances between the transducer array or transducer element may be used to resolve an angle associated with the sonar returns (and, for example, a corresponding object in the underwater environment). The respective angles determined by the relative positions and known distances of the transducer arrays or transducer elements may be compared and combined to generate a two-dimensional and/or a threedimensional position of the sonar return signals (and, for example, a corresponding representation of an object in the underwater environment).

In some example embodiments, the returns from a plurality of the transducer arrays and/or transducer elements may be compared via the process of interferometry to generate one or more angle values. Interferometry may involve determining the angle to a given sonar return signal via a phase difference between the returns received at two or more transducer arrays and/or transducer elements. In some embodiments, the process of beamforming may be used in conjunction with the plurality of transducer arrays and/or transducer elements to generate one or more angle values associated with each sonar return signal. Beamforming may involve generating a plurality of receive-beams at predetermined angles by spatially defining the beams based on the relative phasing of the sonar returns and detecting the distance of the sonar returns in each respective beam. Beamforming and interferometry are further described in U.S. patent application Ser. No. 14/717,458, entitled "Sonar Systems using Interferometry and/or Beamforming for 3D Imaging", published as US 2016/0341827, and U.S. Pat. No. 9,739,884, entitled Systems and Associated Methods for Producing a 3D Sonar Image," both of which are assigned to the Assignee/Applicant of the present application and are hereby incorporated by reference herein in their entireties.

In an example embodiment, a vessel 100 may include a main propulsion motor 105, such as an outboard or inboard motor. Additionally, the vessel 100 may include a trolling motor 108 (or other secondary propulsion system) configured to propel the vessel 100 or maintain a position. The one or more transducer assemblies (e.g., 102a, 102b, and/or 102c) may be mounted in various positions and to various portions of the vessel 100 and/or equipment associated with the vessel 100. For example, the transducer assemblies may be mounted to the transom 106 of the vessel 100, such as depicted by transducer assembly 102a, may be mounted to the bottom or side of the hull 104 of the vessel 100, such as depicted by transducer assembly 102b, or may be mounted to the trolling motor 108, such as depicted by transducer assembly 102c.

Example Transducer Assemblies

FIG. 2 illustrates an example transducer assembly including a transducer housing 200. The transducer assembly may include one or more emitting transducer elements and one or more receiving transducer elements. In some embodiments, a transducer element may serve as both the emitting transducer element and the receiving transducer element. The depicted transducer assembly includes a poly-geometric transducer element arrangement. The transducer housing 200 may include a first emitting transducer element 202 and a second emitting transducer element 204. Each of the emitting transducer elements 202, 204 may be configured to transmit one or more sonar signals into the underwater environment via at least one emitting face of each of the emitting transducer elements 202, 204. The shape of the emitting face of the emitting transducer element 202, 204 may shape the sonar beam emitted therefrom.

The first emitting transducer element 202 has an emitting face in the shape of an elongated rectangle. As used herein "elongated" should be interpreted as having a length (L) that is substantially longer that the width (W). The first emitting transducer element 202, being a piezoelectric crystalline structure, may emit the first sonar signals into the body of water by converting electrical energy into vibrational energy, which is thereby transferred into the water surrounding the transducer assembly. As the vibrations travel away from the emitting face of the first emitting transducer element 202 a fan-shaped sonar beam may be formed (e.g., at −3 dB). The fan-shaped beam 220 may produce sonar returns with high structure detail and relatively low fish detail when rendered in a sonar image, which may be due to the relatively wide section and the relatively narrow section of the fan-shaped beam.

The second emitting transducer element 204 is a substantially cubic rectangular prism with a substantially square emitting face. Alternatively, the second emitting transducer element 204 may be substantially a cylinder with a substantially circular emitting face. As the vibrations of the sonar signal travel away from the emitting face, a cone-shaped beam 230 may be formed (e.g., at −3 dB). The conical beam may produce sonar returns with high fish detail and relatively low structural detail when rendered in a sonar image, which may be due to the relatively wide and equal beam shape and all directions.

Although an elongated rectangular emitting face and a square emitting face are depicted, any emitting face shape may be substituted. The level of detail for both fish and structure may shift respectively as the shape of the resultant beam transitions between the fan shape and the conical shape. In some example embodiments, a first length-to-width ratio (L1/W1) of the first emitting transducer element 202 may be larger than a second length-to-width ratio (L2/W2) of the second emitting transducer element 204, 205, such that each has a differently shaped beam and therefore different resultant sonar image characteristics.

The transducer housing 200 may also include one or more receiving transducer elements 206. The receiving transducer elements 206 may be configured to receive sonar returns from the first sonar signals emitted from the first emitting transducer element 202 and the second emitting transducer element 204. In some embodiments, to facilitate receiving sonar returns from both the first emitting transducer element 202 and the second emitting transducer element 204 without some interference, the first and second emitting transducer elements may be configured to transmit during distinct, e.g. separate, time periods. For example, the first emitting transducer element 202 and the second emitting transducer element 204, 205 may alternately transmit, such that only the first or the second emitting transducer element is transmitting at any one time.

Additionally or alternatively, the first emitting transducer element 202 and the second emitting transducer element 204 may be configured to transmit at different frequencies. For example the first emitting transducer element 202 may be configured to transmit at a first frequency and the second emitting transducer element 204 may be configured to transmit at a second frequency, which is different than the first frequency. The first frequency may be a bandwidth that is sufficiently different from a bandwidth of the second frequency to prevent interface from the other of the emitting transducer elements.

In some example embodiments, the receiving transducer element 206 may be a single transducer element, e.g. piezoelectric crystalline structure, configured to convert the vibrations of the sonar returns into an electrical signal for processing by a sonar signal processor, as discussed below. In an example embodiment, the receiving transducer element 206 may be a transducer array including a plurality of individual transducer elements 208 arranged in a linear array. In some example embodiments, the receiving transducer element 206 may include a plurality of individual transducer elements 208 arranged in a linear array.

The transducer assembly may also include a gyroscope 351 configured to measure angular velocity. The angular velocity may be used to determine orientation data for the gyroscope 351 and thereby determine the transducer assembly orientation. In some embodiments, the transducer assembly also includes an accelerometer 352 configured to measure acceleration. The acceleration measurements may be used to determine if the transducer housing 200 strikes an object, which could cause a misalignment of the transducer assembly from the desired orientation. Additionally or alternatively, the acceleration measurements may be used with the angular velocity measured by the gyroscope 351 to determine an inertial position, as described below. In some example embodiments, the transducer assembly may also include a magnetometer 353 configured to measure a magnetic field strength. The magnetic field strength measurement may be utilized to determine a heading angle, which may be used in the determination of an inertial position. The determination of the orientation of the transducer assembly, striking of an object, and inertial position are discussed in further detail below in reference to FIGS. 4A, 4B, and 5.

In some example embodiments, the gyroscope 351, accelerometer 352, and/or the magnetometer 353 may be portions of a micro-electrical-mechanical system (MEMS) 350. The MEMS may be mounted to the same PCB 201 as the transducer elements 202, 204, and/or 206 directly, or indirectly, such as mounted to a sub-board or stacked board mounted to the PCB including the transducer elements.

Example Architecture

FIG. 3 shows a block diagram of computing device, such as user device 403. The depicted computing device is an example marine electronic device 405. The marine electronic device 405 may include a number of different modules or components, each of which may comprise any device or means embodied in either hardware, software, or a combination of hardware and software configured to perform one or more corresponding functions. The marine electronic device may also be in communication with a network 402.

The marine electronic device 405 may also include one or more communications modules configured to communicate with one another in any of a number of different manners including, for example, via a network. In this regard, the communications module may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays may be included in a marine system 400.

The marine electronic device 405 may include a processor 410, a memory 420, a user interface 435, a display 440, one or more sensors (e.g. position sensor 445, other sensors 447, etc.), and a communication interface 430.

The processor 410 may be any means configured to execute various programmed operations or instructions stored in a memory device such as a device or circuitry operating in accordance with software or otherwise embodied in hardware or a combination of hardware and software (e.g. a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 410 as described herein. In this regard, the processor 410 may be configured to analyze electrical signals communicated thereto to provide or receive sonar data, sensor data, position data, and/or additional environmental data. For example, the processor 410 may be configured to receive sonar return data, generate sonar image data, and generate one or more sonar images based on the sonar image data.

In some embodiments, the processor 410 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other vehicles, e.g. watercraft, etc.

In an example embodiment, the memory 420 may include one or more non-transitory storage or memory devices such as, for example, volatile and/or non-volatile memory that may be either fixed or removable. The memory 420 may be configured to store instructions, computer program code, marine data, such as sonar data, chart data, location/position data, and other data associated with the navigation system in a non-transitory computer readable medium for use, such as by the processor for enabling the marine electronic device 405 to carry out various functions in accordance with example embodiments of the present invention. For example, the memory 420 could be configured to buffer input data for processing by the processor 410. Additionally or alternatively, the memory 420 could be configured to store instructions for execution by the processor 410.

The communication interface 430 may be configured to enable connection to external systems (e.g. an external network 402). In this manner, the marine electronic device 405 may retrieve stored data from a remote server 460 via the external network 402 in addition to or as an alternative to the onboard memory 420. Additionally or alternatively, the marine electronic device may transmit or receive data, such as sonar signals, sonar returns, sonar image data or the like to or from a transducer assembly 102, more particularly to or from a sonar signal processor 449. In an example embodiment, the marine electronics device 405 may communicate with an autopilot 470, including sending route information and/or propulsion commands. In some embodiments, the marine electronic device 405 may also be configured to communicate with a propulsion system 475 of the vessel 100. The marine electronic device 405 may receive data indicative of operation of the propulsion system, such as engine or trolling motor running, running speed, or the like.

The position sensor 445 may be configured to determine the current location of the marine electronic device 405. For example, the position sensor 445 may comprise a GPS, bottom contour, or other location detection system.

The display 440, e.g. screen, may be configured to display images and may include or otherwise be in communication with a user interface 435 configured to receive input from a user. The display 440 may be, for example, a conventional LCD (liquid crystal display), a touch screen display, mobile device, or any other suitable display known in the art upon which images may be displayed.

In any of the embodiments, the display 440 may present one or more sets of marine data (or images generated from the one or more sets of data). Such marine data includes chart data, radar data, weather data, location data, position data, orientation data, sonar data, or any other type of information relevant to the watercraft. In some embodiments, the display 440 may be configured to present such marine data simultaneously as one or more layers or in split-screen mode. In some embodiments, a user may select any of the possible combinations of the marine data for display.

In some further embodiments, various sets of data, referred to above, may be superimposed or overlaid onto one another. For example, a route may be applied to (or overlaid onto) a chart (e.g. a map or navigational chart). Additionally or alternatively, depth information, weather information, radar information, sonar information, or any other navigation system inputs may be applied to one another.

The user interface 435 may include, for example, a keyboard, keypad, function keys, mouse, scrolling device, input/output ports, touch screen, or any other mechanism by which a user may interface with the system.

Although the display 440 of FIG. 3 is shown as being directly connected to the processor 410 and within the marine electronic device 405, the display 440 could alternatively be remote from the processor 410 and/or marine electronic device 405. Likewise, in some embodiments, the position sensor 445 and/or user interface 435 could be remote from the marine electronic device 405.

The marine electronic device 405 may include one or more other sensors 447 configured to measure environmental conditions. The other sensors 447 may include, for example, an air temperature sensor, a water temperature sensor, a current sensor, a light sensor, a wind sensor, a speed sensor, or the like.

The transducer assembly 102 may have one or more transducers (e.g., transducers 448). The transducer assembly 102 may also include a sonar signal processor 449 configured to receive one or more sonar returns and determine sonar image data. Although depicted in the transducer assembly 102, it would be immediately understood by one of ordinary skill in the art, that the sonar signal processor 449 may be a portion of the user device 403, the marine electronic device 405, the processing circuitry 407, the processor 410, or another remote device/system. Additionally, the transducer assembly 102 may include a gimbal mount 455 or other transducer mount. The gimbal mount 455 may include one or more adjustable mountings configured to enable the transducer assembly 102 to be positioned to a desired orientation based on the type of transducer assembly, e.g. forward scan, downscan, sidescan, or the like. Additionally, in some embodiments, the adjustable mountings may include an automatic adjustment device, such as a servo motor. The servo motor may receive one or more commands from the processing circuitry 407, via the communication interface 430 to move the transducer assembly 102 about the adjustable mount to adjust the orientation of the transducer assembly.

In an example embodiment, the transducer assembly 102 and/or the marine electronics device 405 may include a gyroscope 451, an accelerometer 452, and/or a magnetometer 453. FIG. 3 shows such components in both the transducer assembly 102 and the marine electronics device 405, however, in some embodiments, such components may only be present in one of the transducer assembly 102 or marine electronics device 405. The gyroscope 451, the accelerometer 452, and/or the magnetometer 453 may be portions of a microelectromechanical system (MEMS) 450. The gyroscope 451 may be configured to measure an angular velocity of the gyroscope 451. In some example embodiments, the gyroscope 451 may be a vibrating structure MEMS gyroscope including gyroscopic sensors oriented in a plurality of axes. The accelerometer 452 may be configured to measure acceleration of the accelerometer. In some example embodiments, the accelerometer may be a variable capacitive (VC) MEMS accelerometer, a piezoresistive (PR) MEMS accelerometer, or the like. The magnetometer 453 may be configured to measure a magnetic field strength, which may be used to find magnetic north and/or a heading angle. In an example embodiment, the magnetometer may be a Lorentz force based MEMS sensor, electron tunneling MEMS sensor, MEMS compass, or the like.

The autopilot 470 may include processing circuitry, such as a processor and a memory, configured to operate the propulsion system 475. The autopilot 470 may be configured to operate the propulsion system 475 automatically, e.g. without user interaction, causing the watercraft, to travel along a desired route to a desired location. The autopilot 470 may generate instructions based on a current location or inertial position of the watercraft, a desired route, a desired location, or the like to operate the propulsion system 475.

The propulsion system 475 may include the main propulsion motor 105 and/or trolling motor 108. The propulsion motor 105 and/or the trolling motor 108 may include one or more sensors to measure operation or speed of main propulsion motor 105 and/or the trolling motor 108.

Example Flowchart(s) and Operations

Embodiments of the present invention provide methods, apparatus and computer program products for operating a marine system, such as described herein. Various examples of the operations performed in accordance with embodiments of the present invention will now be provided with reference to FIGS. 4A, 4B, and 5.

FIGS. 4A, 4B, and 5 illustrates a flowchart according to example methods for operating a marine system according to an example embodiment. Some examples of modifications, optional operations, and augmentations are also described below, as indicated by dashed lines.

The operations illustrated in and described with respect to FIGS. 4A, 4B, and 5 may, for example, be performed by, with the assistance of, and/or under the control of one or more of the processor 410, memory 420, communication interface 430, user interface 435, position sensor 445, other sensor 447, transducer assembly 102, gyroscope 451, accelerometer 452, magnetometer 453, transducer(s) 448, sonar signal processor 449, display 440, autopilot 470, and/or propulsion system 475.

In regard to FIGS. 4A and 4B, the method may include, at operation 502, determining orientation data associated with at least one transducer 448 based on the angular velocity measured by a gyroscope 451 associated with the at least one transducer. The gyroscope 451 may be mounted to the same PCB as the transducer assembly or otherwise maintained in the same relative orientation as the transducer assembly 102, such as by molding, housing mounting, or the like, such that a change in orientation of the transducer 448 causes a corresponding change in the orientation of the gyroscope 451. The difference in relative orientation may be determined based on a prior performed calibration, prior testing, and/or design of mountings within the transducer housing. The difference in the relative orientation may be stored in a memory, such as memory 420, for orientation calculations.

The gyroscope 451 may measure an angular velocity that is representative of a difference of the gyroscope orientation to a central gravitational pull, e.g. down. The processor 410 may determine an orientation of the transducer assembly 102 and thereby one or more transducers 448 based on the measured angular velocity.

The method may include determining if the orientation data corresponds to the at least one transducer 448 being in a desired orientation at operation 504. The transducer assembly 102 may include one or more transducers, each having a preferred or desired orientation angle. The desired orientation angle may be based on the type of transducer 448. For example a downscan transducer may have a desired orientation of 0 degrees, e.g. down. A forward scan may have a desired orientation including a pitch, or tilt, angle of +10 degrees, +20 degrees, +30 degrees, or the like, corresponding to the emitting face of transducer being angled forward 10 degrees, 20 degrees, 30 degrees, or other suitable orientation angle. A sidescan transducer may have a desired orientation including a roll angle of +5 degrees, +10 degrees, +20 degrees, or the like for a right or left sidescan transducer and a roll angle of −5 degrees, −10 degrees, −20 degrees, or the like for the other of the right or left sidescan transducer, corresponding to the orientation angle left and right of down from the side of the watercraft. Generally, transducers 448 may have a yaw, or direction, angle of 0 degrees at the desired orientation, however some example embodiments may have transducers with non-zero yaw angles in the desired orientation.

The processor 410 may determine the orientation of the gyroscope 451 based on the measured angular velocity. The processor 410 may then apply the relative difference between the gyroscope orientation and the transducer orientation to the determined gyroscope orientation to determine the orientation of the transducer 448. The orientation of the transducer 448 may then be compared to the desired orientation to determine if the orientation data corresponds to the at least one transducer 448 being in the desired orientation.

The processor 410 may determine if the orientation data satisfies a predetermined sonar position threshold at operation 506. The predetermined sonar position threshold may be +/−1 degree, +/−2 degrees, +/−5 degrees, or other suitable value from the desired orientation in pitch, yaw, or roll. The processor 410 may compare the orientation of the transducer 448 to the desired orientation and determine an orientation difference. The orientation difference may then be compared to the predetermined sonar position threshold.

In response to the processor 410 determining that the orientation data is not in the desired orientation, e.g. the orientation data exceeds the predetermined sonar position threshold, the processor 410 may cause an alert at operation 508. The alert may be an audio and/or visual output via the user interface 435. For example, an audio alert may include a buzzer, beep, alarm, voice message, or the like. A visual alert may include a text box, flashing light or portion of the display, or the like. The alert may draw the attention of the operator, thereby informing the operator that the transducer 448 is no longer in a desired orientation and that sonar data collected by the transducer 448 may not be accurate, such as due to parallax error.

In an example embodiment, the processor 410 may determine an orientation correction based on the difference between the orientation data and a reference orientation at operation 510. The reference orientation may correspond to the transducer 448 being in the desired orientation. The orientation correction may be the opposite of the difference between the orientation data and the desired orientation. For example, if the orientation data for a downscan transducer included a yaw angle of +5 degrees, a pitch angle of −3 degrees, and a roll angle of 0 degrees and the desired orientation is a yaw angle, pitch angle, and roll angle of 0 degrees, the orientation correction may be a yaw correction of −5 degrees and a pitch correction of +3 degrees. The orientation data, desired orientation, and/or the orientation correction may be displayed on the user interface 435 as a numerical value or a visual representation. The operator may utilize the displayed values or visual representation to adjust the transducer assembly 102 to the desired orientation. In some examples, operations 502-510 may repeat periodically, or continuously, to provide the operator feedback during the repositioning of the transducer 448 to the desired orientation.

In some example embodiments, the processor 410 may cause the transducer 448 to be positioned to the reference orientation based on the orientation correction at operation 512. The processor 410 may send one or more control signals to one or more servo motors of the gimbal mount 455 to adjust the transducer to the desire orientation. In an example embodiment, the processor 410 may periodically determine the orientation data and orientation correction during the re-positioning of the transducer until the orientation data matches the desired orientation and/or is within the predetermined sonar position threshold.

Operations 502-512, of the method above, may be performed periodically, such as once per minute, one per program loop, once per ten minutes, or other suitable periodicities. In some embodiments, operation 502-512 may be performed on demand, such as in response to an operator input using the user interface 435. Additionally or alternatively, operations 502-512 may be performed in response to a strike determination, in which the processor 410 determines that the transducer assembly 102 has collided with an object and that the collision may have changed the orientation of one or more transducers 448.

At operation 514, the processor 410 may receive acceleration data from an accelerometer associated with the at least one transducer. The processor 410 may then determine if the acceleration data exceeds a predetermine strike threshold at operation 516. Collision with an object may cause a momentary step change in the acceleration, or may cause a momentary change in the acceleration direction as the transducer changes orientation in response to the collision. In some instances, the acceleration may drop and return to, or near, a pervious value. The predetermined strike threshold may be, for example, a change of 1 meter per second, 2 meters per second, or any other suitable value in a predetermined time period such as 0.5 seconds, 1 second, or other suitable time period.

In some example embodiments, the processor 410 may indicate that the sonar data collected while the transducer 448 is not in the desired orientation may be inaccurate. Additionally, in some embodiments in which the sonar data is associated with a location of collection, the processor 410 may indicate location in which the sonar data was collected with the transducer out of the desired orientation. In response to the processor 410 determining the orientation exceeds the predetermined sonar position threshold at operation 506, the method may continue by causing an indication of the orientation data exceeding the predetermined sonar position threshold to be associated with sonar data received from the one or more transducers at operation 518. The indication may include a data prefix or suffix of the sonar data or data storage address, storage of the sonar data in a particular storage location of memory 420, include highlighting of the sonar data in a sonar image, or other suitable indicator. As depicted in FIG. 6, the sonar image 700 includes a highlighted portion 702 indicating that the sonar data collected in the highlighted portion 702 may be inaccurate, due to at least one transducer being out of the desired orientation.

The processor 410 may cause an indication of one or more locations associated with sonar data received during a period in which the orientation data exceeds the predetermined sonar threshold to be displayed on a navigational chart at operation 520. The indication of locations may be plots of areas in which the sonar data was collected, or one or more trails of routes in which the sonar data was collected. In some embodiments, the sonar data, or a portion of the sonar data may be overlaid, on the navigational chart and the location and portion of the sonar data collected while the transducer 448 was out of the desired orientation may be indicated, such as by highlighting. As depicted in FIG. 7, a navigational chart 706 includes the location of the watercraft 708. A sidescan sonar image 710 is overlaid on the navigational chart based on the location of collection of the sonar data. Here the sonar image 710 includes a highlighted portion 712 indicating that that portion of the sonar data was collected while at least one transducer was not in the desired orientation.

In an example embodiment, the processor 410 may receive an indication of a selected location of the one or more locations associated with sonar data received during a period in which the orientation data exceeds the predetermine sonar position threshold at operation 522. The processor 410 may receive an operator input on the user interface 435 selecting one or more locations. For example, after the operator or the processor 410 corrects the orientation of the transducer 448 to the desired orientation, the operator may desire to return to a previous location to re-perform the sonar scan. The processor 410 may cause a route to the selected location to be displayed on the user interface for the operator to pilot to the selected location.

In some example embodiments, the processor 410 may cause an autopilot 470 to navigate the watercraft associated with the transducer assembly 102 to the selected location at operation 524. The processor 410 may send route information and/or one or more propulsion commands to the autopilot 470. The autopilot 470 may then cause the propulsion system 475 to execute the route and/or commands to navigate to the selected location.

Turning to the example method of FIG. 5, the processor 410 may receive position data from one or more position sensors 445 at operation 602. The position data may include one or more signals, such as GPS signals, or cellular signals from which the processor 410 may triangulate a position of the watercraft. At operation 604, the processor 410 may determine an initial location based on the position data. The processor 410 may triangulate the initial position and save the initial position to memory, such as memory 420 for further calculations.

The processor 410 may determine orientation data based on an angular velocity measured by the gyroscope 451 associated with the sonar transducer 448 and/or the marine electronics device 405. The orientation data may include a yaw angle, a pitch, angle, and a roll angle. An accelerometer 452 may be associated with each of a yaw axis, a pitch axis, and a roll axis configured to measure the linear acceleration associated with each axis. The processor 410 may set an inertial reference frame based on the orientation data. The deviations from the inertial reference frame may be indicative of movement of the gyroscope 451, and thereby movement of the marine electronics device 405. The inertial reference frame may also include an initial orientation provided via operator input and/or determined by the processor 410 based on receiving magnetic field strength data from a magnetometer 453. The processor 410 may use the magnetic field strength data to determine the direction of magnetic north relative to the marine electronics device 405.

At operation 610, the processor 410 may receive acceleration data from an accelerometer 452 associated with the transducer 448 or marine electronics device 405, and receive angular velocity data from the gyroscope at operation 612. The processor 410 may receive the angular velocity data and accelerometer data continuously or at a near continuous periodicity, such as once per 0.5 seconds, once per second, once preprogram loop, or the like, after the inertial reference frame has been set. The calculation of the current inertial position, as described below, may be cumulative in regard to the angular velocity data and accelerometer data.

At operation 614, the processor 410 may determine linear accelerations in the inertial reference frame based on the acceleration data and the angular velocity data. The processor 410 may determine the orientation of each axis of the inertial reference frame and the linear acceleration associated with each axis. The processor 410 may determine inertial velocities based on the linear accelerations at operation 616.

To reduce error or drift in orientation, the processor 410 may receive magnetic field strength data from the magnetometer 453 at operation 618. The processor 410 may utilize the magnetic field strength data to determine a heading angle at operation 620. The heading angle may be used to correct orientation drift or error in the calculated orientation of the gyroscope 451.

Continuing at operation 622, the processor 410 may determine a current inertial position based on the inertial velocities and the inertial position. The processor 410 may integrate the linear velocities using kinematics equations to determine a current velocity of the marine electronics device 405. The processor 410 may then integrate the computed current velocity to determine a current inertial position based on the initial position.

The processor 410 may be configured to determine if current position data is available at operation 624. The processor 410 may periodically or continuously monitor position data to determine a current location and display the current location on a nautical chart on the user interface 435. FIG. 8 depicts a navigational chart 806, e.g. nautical chart, including a watercraft position 808. As indicated by the text box 810, the watercraft position 808 indicated is the current location calculated based on GPS position data. In some example embodiments, the processor 410 may be configured to determine that position data is unavailable in response to position data being unavailable for a predetermined period, such as 10 seconds, 30 seconds, 1 minute, or other suitable time period.

In an instance in which the processor 410 determines that the position data is available, the processor may verify the current location based on position data against the current inertial position. The processor 410 may compare the current location to the current inertial position to determine a location position difference. If the location position difference exceeds a predetermined threshold, such as 1 meter, 10 meters, or other suitable distance value, the processor 410 may cause an alert. The alert may be an audio or visual alert configured to inform the operator that there is a significant difference between the current location based on position data and the current inertial position, which may be indicative of an error in the current location and/or the current inertial position.

In some instances, one or more signals of the position data may be obstructed, such as by earth, such as when the marine electronics device 405 is in a valley, near a bluff, in a cave, or the like, by foliage, such as a tree canopy, or by inclement weather. The processor 410 may require a predetermined number of signals including position data to triangulate a location, such as at least three signals, at least four signals, or the like. If the processor 410 determines that an insufficient number of signals are received, the processor 410 may determine that position data is unavailable.

The processor 410 may cause the current inertial position to be displayed on the nautical chart in response to the position data being unavailable at operation 626. The processor 410 may update the watercraft position 808 with the current inertial position instead of the current location based on the position data. FIG. 9 depicts a navigational chart 806' including the watercraft position 808'. The text box 810' indicates that the watercraft position is representative of the current inertial position, e.g. "gyro pos." and that "No GPS signal" is available. In this example the position data may be obstructed by the foliage 814 as the watercraft nears the bank, or shoreline, where the canopy of the trees may cover at least a portion of the watercraft.

In an instance in which the processor 410 is providing route information or commands to the autopilot for navigation, the processor 410 may cause the autopilot 470 to navigate based on current inertial position at operation 628. The processor 410 may cause the autopilot 470 to navigate based on the current inertial position, instead of the current location, when the position data and therefore current location are determined to be unavailable.

In an example embodiment, the processor 410 may receive sonar data from the transducer 448 at operation 630. The processor 410 may associate the sonar data with current position data, e.g. a current location, at operation 632. The processor 410 may store the current location with the sonar data in the memory 420, append the current location data to the sonar data, or the like to provide a location of collection of the sonar data for display, overlay on a navigational chart, or later review.

In response to the processor 410 determining that the position data is unavailable, the processor 410 may associate the sonar data with the current inertial position. The processor 410 may associate the sonar data with the current inertial position instead of the current location based on position data, when the position data is not available. The association of the sonar data with the current inertial position may be substantially similar to the association of the sonar data to the current location based on the position data, as discussed above.

In some example embodiments, the processor 410 may cause an indication of a location where the sonar data is associated with the current inertial position to be displayed on a navigational chart. Referring back to FIG. 9, the navigational chart 806' includes an indication 812 of locations in which the sonar data is associated with a current inertial position. In an example embodiment in which the sonar data is overlaid on the navigational chart, such as depicted in FIG. 7, the indication 812 may include highlighting or otherwise annotating the sonar data associated with the current inertial position instead of the current location based on position data.

FIGS. 4A, 4B, and 5 illustrate flowcharts of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 420 and executed by, for example, the processor 410. As will be appreciated, any such computer program product may be loaded onto a computer or other programmable apparatus (for example, a marine electronic device 405) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 405) to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

That which is claimed:

1. A sonar assembly for a watercraft, the sonar assembly comprising:
    a transducer housing;
    at least one mounting feature for fixedly mounting the transducer housing in a fixed orientation to the watercraft or a trolling motor configured for attachment to the watercraft;
    at least one transducer configured to transmit one or more sonar beams into an underwater environment, wherein the at least one transducer is positioned and oriented within the transducer housing such that the at least one transducer is configured to transmit the one or more sonar beams into a portion of the underwater environment when the transducer housing is at least partially submerged;

a gyroscope configured to measure angular velocity associated with the at least one transducer;

a processor; and a memory including computer program code configured to, when executed on the processor, cause the processor to:

determine orientation data associated with the at least one transducer based on the angular velocity measured by the gyroscope;

determine if the orientation data corresponds to the at least one transducer being in a desired orientation, wherein the desired orientation is constant and fixed relative to the watercraft or the trolling motor to which the transducer housing is mounted;

determine if the orientation data satisfies a predetermined sonar position threshold such that the resulting sonar data from the at least one transducer is out of a desired alignment;

cause an indication of exceeding the predetermined sonar position threshold to be associated in the memory with sonar data received during a period in which the orientation data exceeds the predetermined sonar position threshold so as to indicate that the sonar data received during the period is misaligned sonar data; and cause an alert in response to the at least one transducer not being in the desired orientation, wherein the alert provides an indication that the at least one transducer is not in the desired orientation and an indication regarding the misaligned sonar data.

2. The sonar assembly of claim 1, wherein the gyroscope comprises a first portion of a microelectromechanical system (MEMS).

3. The sonar assembly of claim 2 further comprising:
an accelerometer, wherein the accelerometer comprises a second portion of the MEMS.

4. The sonar assembly of claim 3 further comprising:
a magnetometer, wherein the magnetometer comprises a third portion of the MEMS.

5. The sonar assembly of claim 1, wherein the gyroscope is mounted to the same printed circuit board (PCB) assembly as the at least one transducer.

6. The sonar assembly of claim 1, wherein the memory and the computer program code are further configured to cause the processor to:
determine an orientation correction based on a difference between the orientation data and a reference orientation, wherein the reference orientation corresponds to the at least one transducer being in the desired orientation.

7. The sonar assembly of claim 6, wherein the memory and the computer program code are further configured to cause the processor to:
cause the sonar transducer to be re-positioned to the reference orientation based on the orientation correction.

8. The sonar assembly of claim 1, further comprising an accelerometer associated with the at least one transducer.

9. The sonar assembly of claim 8, wherein the memory and the computer program code are further configured to cause the processor to:

receive acceleration data from the accelerometer associated with the at least one transducer; and determine if the acceleration data exceeds a predetermined strike threshold.

10. The sonar assembly of claim 1, wherein the memory and the computer program code are further configured to cause the processor to:
cause sonar image data corresponding to the misaligned sonar data to be highlighted in a sonar image on a display, wherein non-misaligned sonar data is not highlighted in the sonar image.

11. The sonar assembly of claim 1, wherein the memory and the computer program code are further configured to cause the processor to:
cause indication of one or more locations associated with sonar data received during the period in which the orientation data exceeds the predetermined sonar position threshold to be displayed on a navigational chart as a selectable location relative to a representation corresponding to a current position of the watercraft.

12. The sonar assembly of claim 11, wherein the memory and the computer program code are further configured to cause the processor to:
receive an indication of a selection of the one or more locations associated with sonar data received during the period in which the orientation data exceeds the predetermined sonar position threshold.

13. The sonar assembly of claim 12, wherein the memory and the computer program code are further configured to cause the processor to:
cause an autopilot to navigate a watercraft associated with the sonar assembly to the selected one or more locations to enable capturing of new sonar data of the underwater environment corresponding to the one or more locations.

14. A marine electronics system for a watercraft, the marine electronics system comprising:
a transducer housing comprising:
at least one mounting feature for fixedly mounting the transducer housing in a fixed orientation to the watercraft or a trolling motor configured for attachment to the watercraft;
at least one transducer configured to transmit one or more sonar beams into an underwater environment, wherein the at least one transducer is positioned and oriented within the transducer housing such that the at least one transducer is configured to transmit one or more sonar beams into a portion of the underwater environment when the transducer housing is at least partially submerged; and
a gyroscope configured to measure angular velocity associated with the at least one transducer;

a processor; and a memory including computer program code configured to, when executed by the processor, cause the processor to:

determine orientation data associated with the at least one transducer based on the angular velocity measured by the gyroscope;

determine if the orientation data corresponds to the at least one transducer being in a desired orientation, wherein the desired orientation is constant and fixed relative to the watercraft or the trolling motor to which the transducer housing is mounted;

determine if the orientation data satisfies a predetermined sonar position threshold such that the resulting sonar data from the at least one transducer is out of a desired alignment;

cause an indication of exceeding the predetermined sonar position threshold to be associated in the memory with sonar data received during a period in which the orientation data exceeds the predetermined sonar position threshold so as to indicate that the sonar data received during the period is misaligned sonar data; and cause an alert in response to the at least one transducer not being in the desired orientation, wherein the alert provides an indication that the at least one transducer is not in the desired orientation and an indication regarding the misaligned sonar data.

15. The marine electronics system of claim 14, wherein the transducer housing further comprises an accelerometer and a magnetometer, and wherein the gyroscope, the accelerometer, and the magnetometer comprise portions of a microelectromechanical system (MEMS).

16. The marine electronics system of claim 14, wherein the gyroscope is mounted to the same printed circuit board (PCB) assembly as the at least one transducer.

17. The marine electronics system of claim 14, wherein the memory and the computer program code are further configured to cause the processor to:

determine an orientation correction based on a difference between the orientation data and a reference orientation, wherein the reference orientation corresponds to the at least one transducer being in the desired orientation.

18. The marine electronics system of claim 17, wherein the memory and the computer program code are further configured to cause the processor to:

cause the sonar transducer to be re-positioned to the reference orientation based on the orientation correction.

19. The marine electronics system of claim 14, wherein the memory and the computer program code are further configured to cause the processor to:

receive acceleration data from an accelerometer associated with the at least one transducer; and determine if the acceleration data exceeds a predetermined strike threshold.

20. A method, the method comprising:

determining, via a processor, orientation data associated with at least one transducer of a sonar assembly for a watercraft based on the angular velocity measured by a gyroscope, wherein the sonar assembly comprises:

a transducer housing;

at least one mounting feature for fixedly mounting the transducer housing in a fixed orientation to the watercraft or a trolling motor configured for attachment to the watercraft;

the gyroscope; and the at least one transducer, wherein the at least one transducer is configured to transmit one or more sonar beams into an underwater environment, wherein the at least one transducer is positioned and oriented within the transducer housing such that the at least one transducer is configured to transmit the one or more sonar beams into a portion of the underwater environment when the transducer housing is at least partially submerged, wherein the gyroscope is configured to measure angular velocity associated with the at least one transducer;

determining if the orientation data corresponds to the at least one transducer being in a desired orientation, wherein the desired orientation is constant and fixed relative to the watercraft or the trolling motor to which the transducer housing is mounted;

determining if the orientation data satisfies a predetermined sonar position threshold such that the resulting sonar data from the at least one transducer is out of a desired alignment;

causing an indication of exceeding the predetermined sonar position threshold to be associated in the memory with sonar data received during a period in which the orientation data exceeds the predetermined sonar position threshold so as to indicate that the sonar data received during the period is misaligned sonar data; and causing an alert to be presented to an operator of the watercraft in response to the at least one transducer not being in the desired orientation, wherein the alert provides an indication that the at least one transducer is not in the desired orientation and an indication regarding the misaligned sonar data.

* * * * *